(No Model.) 2 Sheets—Sheet 1.
H. T. RICHMOND.
NECK YOKE ATTACHMENT.
No. 527,372. Patented Oct. 9, 1894.
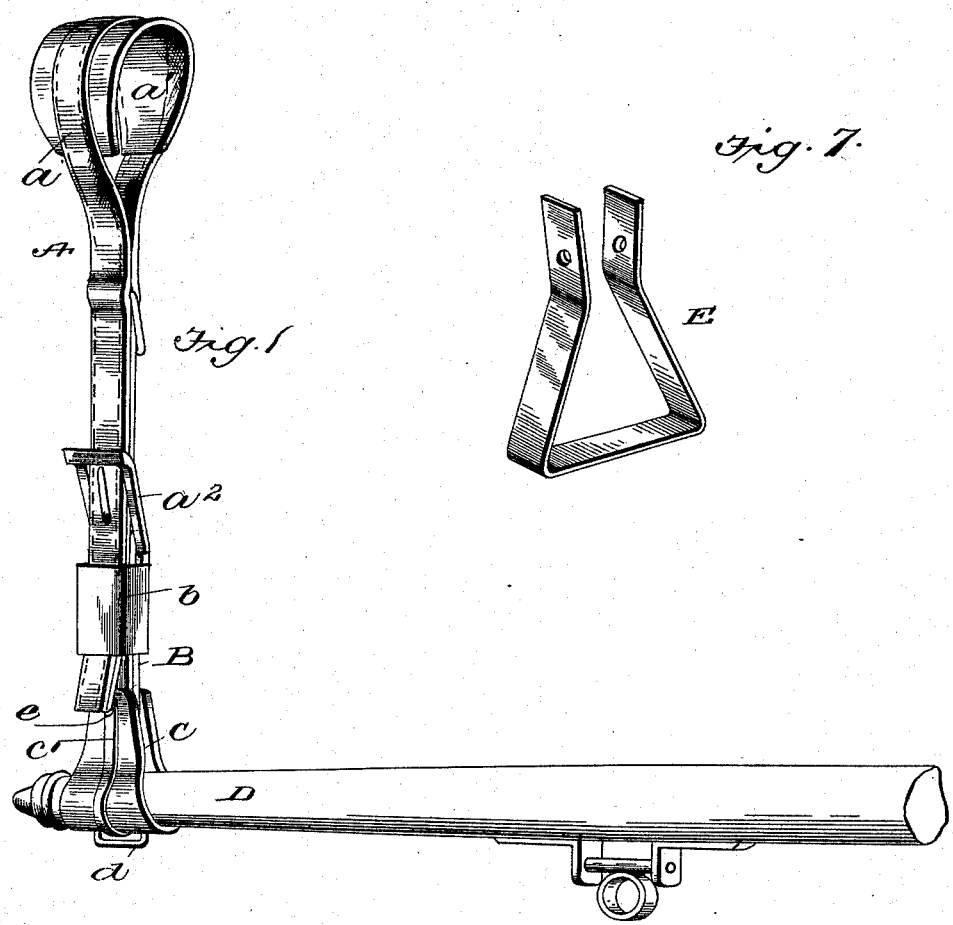
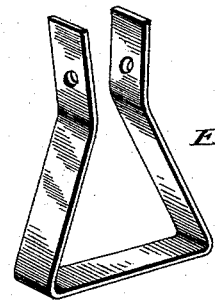
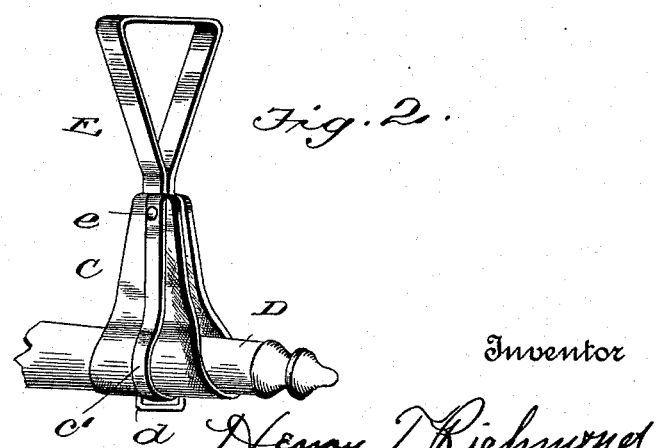
Witnesses
Inventor
Henry T. Richmond
By H. D. Willson, Attorney (No Model.) 2 Sheets—Sheet 2.
H. T. RICHMOND.
NECK YOKE ATTACHMENT.
No. 527,372. Patented Oct. 9, 1894.
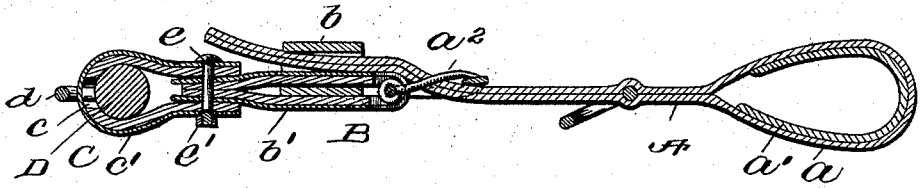
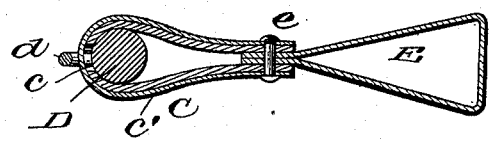
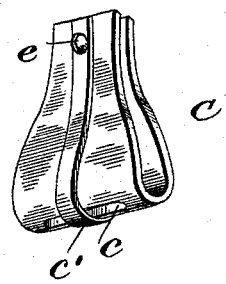
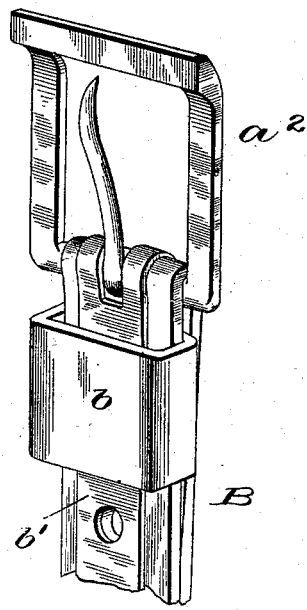
Witnesses
Inventor
Henry T. Richmond
By H. A. Willson
Attorney
THE NORRIS PETERS CO., PHOTO-LITHO., WASHINGTON, D. C.

UNITED STATES PATENT OFFICE.

HENRY T. RICHMOND, OF MALVERN, IOWA.

NECK-YOKE ATTACHMENT.

SPECIFICATION forming part of Letters Patent No. 527,372, dated October 9, 1894.

Application filed April 4, 1894. Serial No. 506,305. (No model.)

*To all whom it may concern:*

Be it known that I, HENRY T. RICHMOND, a citizen of the United States, residing at Malvern, in the county of Mills and State of Iowa, have invented certain new and useful Improvements in Neck-Yoke Attachments; and I do declare the following to be a full, clear, and exact description of the invention, such as will enable others skilled in the art to which it appertains to make and use the same.

My invention relates to certain improvements in harness-attachments, more especially in the means for hitching-up the team to the pole or tongue, and it has for its object to effect this in a simple and effective manner; to reduce wear and friction to a minimum and to provide for freedom of movement and without noise or rattle between the parts, and for the convertibility of the attachment for use either with light, or heavy, vehicles; and to these ends the invention consists of a breast-strap having a novel connection with the neck-yoke and adapted for connection either with the collar as in light vehicles, or with the breast-piece, as in heavy vehicles, all substantially as hereinafter more fully disclosed and specifically pointed out in the claims.

In the accompanying drawings, Figure 1 is a view showing my invention as applied for use for light vehicles. Fig. 2 is a similar view showing the invention as adapted for heavy vehicles. Fig. 3 is a sectional view taken through Fig. 1. Fig. 4 is a similar view taken through Fig. 2. Figs. 5 and 6 are detail views of the form of my invention disclosed in Figs. 1 and 3, and Fig. 7 is a detail view of the form embodied in Figs. 2 and 4.

In carrying out my invention, I employ a breast-strap A, the upper end of which is formed into a loop $a$, to permit its ready application to, and through which passes, the collar, and upon the inside of this loop is secured a widened, shield like piece of leather $a'$ forming an extended bearing-surface therefor upon the collar, to reduce the tendency the strap otherwise would have of cutting or wearing out the collar, and undue friction thereat.

The strap A is buckled as at $a^2$ near its lower end, to a suspender-like end-piece B consisting of a strap doubled upon itself into a loop carrying the buckle effecting the connection between it and said strap A, and having secured to itself a loop $b$ which receives and confines the free end of the strap A. The end piece B is exteriorly armed, or has applied to it, a bent metal strap or jacket $b'$ conforming thereto, and into which said end-piece B is forced and tightly retained, the bent end of said metal strap or jacket, and of the end-piece, having coincident slots for the buckle-tongue to play through.

C is a carrier or loop to receive and carry one end of the neck-yoke D, is of leather and also widened to furnish a broad or extended bearing surface for the latter, with its bottom portion transversely slotted as at $c$ to receive, or permit the passage therethrough of, an eye or staple $d$ on the neck yoke, and compassing the carrier or loop C is also a reinforcing metal-strap or jacket $c'$, carried or looped through said eye or staple, thus holding the carrier or loop C in position on the neck-yoke.

The end-strap B, with its bent metal-strap $b'$, and the loop or carrier C, with its bent metal-strap $c'$, are swiveled together to permit independent lateral play thereof to lessen friction and prevent buckling of the breast-strap, the swiveling connection being effected by a readily manipulated screw-bolt $e$ passing loosely through apertures in the aforesaid parts and having its screw-threaded end suitably held in a screw-threaded socket-piece or nut $e'$ applied thereto, outside of the adjacent arm of the bent metal-strap $c'$.

All the metal-parts of the invention being out of contact with each other and with any other moving parts it is obvious that the same will be noiseless in operation or use.

This form of my invention is suited for light vehicles, or wherein the breast-strap is connected directly to the collar.

As shown in Figs. 2, 4 and 7, provision is also made for the application of my invention to heavy vehicles, or wherein a breast-piece is employed, and to effect this, I substitute in lieu of the breast-strap A and end-strap B a metal loop E swiveled directly to the neck-yoke carrier C and which is slipped upon, and directly through which is passed, the breast-piece. The metal loop E is formed of a metal strap bent to conform to the shape of the breast-piece, in the present instance said loop having an approximate stirrup-form.

Having thus fully described my invention, what I claim, and desire to secure by Letters Patent, is—

1. The combination of a breast strap having a loop $a$, at its upper end, a bearing loop or surface $a'$ of leather upon the inner side of the loop $a$, and having greater width than the latter, an end-piece B carried by said breast strap and carrying a loop $b$, which receives the free end of the breast strap, a metal strap $b'$ encompassing the loop $b$, and a neck-yoke carrier C swiveled to the end-piece B and having its bottom portion slotted as at $c$, the neck-yoke provided with a staple projecting through the slot $c$, and a metal strap $c'$ encompassing the carrier C and passing through the staple, as and for the purpose specified.

2. The combination with the neck-yoke carrier C of a metal strap of less width than the carrier and encompassing the same, said carrier being provided at its bottom portion with a slot $c$, a neck-yoke provided with a staple passing through said slot, said strap passing through said staple and a connecting piece swiveled to the upper portion of the carrier and adapted to be connected with a breast-piece, as and for the purpose specified.

In testimony whereof I affix my signature in presence of two witnesses.

HENRY T. RICHMOND.

Witnesses:
GEO. B. FOUCKS,
JOHN DU SHANE.